United States Patent
Milton et al.

(10) Patent No.: US 11,544,647 B2
(45) Date of Patent: Jan. 3, 2023

(54) USER AVAILABILITY IN PERSONAL INFORMATION MANAGEMENT SERVICE

(71) Applicant: Microsoft Technology Licensing, LLC, Redmond, WA (US)

(72) Inventors: Victoria Elizabeth Milton, Woodinville, WA (US); Charlie Ricafort Chung, Tacoma, WA (US); Julia Nancy Foran, Seattle, WA (US); Jaya Matthew, Seattle, WA (US); Roma Ajit Shah, Kirkland, WA (US); Mirela Dal Col Silva Correa, Kirkland, WA (US); Hemant Sharma, Seattle, WA (US); Dipak Sarjerao Pawar, Seattle, WA (US); Haebin Seo, Seattle, WA (US); Montine Andrea Rummel, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 210 days.

(21) Appl. No.: 16/401,507

(22) Filed: May 2, 2019

(65) Prior Publication Data
US 2020/0349275 A1 Nov. 5, 2020

(51) Int. Cl.
*G06Q 10/06* (2012.01)
*G06F 9/451* (2018.01)
*G06F 21/62* (2013.01)

(52) U.S. Cl.
CPC ....... *G06Q 10/06314* (2013.01); *G06F 9/451* (2018.02); *G06F 21/6245* (2013.01)

(58) Field of Classification Search
None
See application file for complete search history.

(56) References Cited

U.S. PATENT DOCUMENTS 9,076,008 B1 7/2015 Moy
2001/0014866 A1* 8/2001 Con .................. G06F 40/103
705/7.19

(Continued)

FOREIGN PATENT DOCUMENTS

JP 2002236789 A * 8/2002 ........... G06Q 10/109

OTHER PUBLICATIONS

Hala ElAarag et al., Web-Based Systems for Communication and Scheduling, 2003, The Shape of Knowledge, IEEE International Professional Communication Conference, 2003. (Year: 2003).*

(Continued)

*Primary Examiner* — Jerry O'Connor
*Assistant Examiner* — Matthew H Divelbiss
(74) *Attorney, Agent, or Firm* — Alleman Hall Creasman & Tuttle LLP

(57) ABSTRACT

A computing device includes a processor and associated memory. The processor is configured to execute a personal information management service stored in memory to send a first calendar entry for display on a calendar interface for a user. The first calendar entry is for a first account of the user of a first domain. The processor sends a second calendar entry for display on the calendar interface. The second calendar entry is for a calendar of a second account of the user of a second domain. The processor receives a request for an availability of the user from a requesting user having a third account of the first domain. In response to the request, the processor sends to the requesting user the first calendar entry including first calendar entry details, and the second calendar entry without second calendar entry details.

14 Claims, 10 Drawing Sheets

(56) References Cited

U.S. PATENT DOCUMENTS

| | | | | |
|---|---|---|---|---|
| 2003/0120717 | A1* | 6/2003 | Callaway | H04L 67/52 709/201 |
| 2008/0040188 | A1* | 2/2008 | Klausmeier | G06Q 10/1093 705/7.18 |
| 2009/0248480 | A1* | 10/2009 | Miksovsky | G06Q 10/109 705/7.19 |
| 2009/0313074 | A1 | 12/2009 | Harpur et al. | |
| 2012/0284637 | A1* | 11/2012 | Boyer | G06Q 10/109 715/751 |
| 2013/0036369 | A1* | 2/2013 | Mitchell | G06Q 50/00 715/753 |
| 2014/0282828 | A1 | 9/2014 | Stuntebeck | |

OTHER PUBLICATIONS

"Connect Your Personal and Work Calendars in Google Calendar", Retrieved from https://www.bettercloud.com/monitor/the-academy/connect-your-personal-and-work-calendars-in-google-calendar/, Nov. 30, 2016, 4 Pages.

"How To Hide Appointments In A Shared Calendar In Outlook?", Retrieved from https://www.extendoffice.com/documents/outlook/4501-outlook-shared-calendar-hide-appointments.html, Jan. 19, 2017, 9 Pages.

Roman, Will, "Auto Block Time on Your Work Google Calendar for Your Personal Events", Retrieved from https://medium.com/@willroman/auto-block-time-on-your-work-google-calendar-for-your-personal-events-2a752ae91dab, Apr. 18, 2017, 8 Pages.

"International Search Report and Written Opinion Issued in PCT Application No. PCT/US20/026973", dated May 27, 2020, 12 Pages.

* cited by examiner

26A

| SETTINGS | View | AVAILABILTY | Save  Discard  × |
| --- | --- | --- | --- |
| 🔍 Search | Events and invitations | Combine calendar availability | |
| ⚙ General | Weather | Combining a personal calendar with your work calendar lets other people see your true availability when organizing meetings. They won't see details on your personal calendar – just times that you're free or busy. Learn more. | |
| ✉ Mail | Events from email | | |
| 📅 Calendar | Agenda mail | Select the account to include with your availability in your work or school account. | |
| | Shared calendars | ○ user1@domain2.com | |
| | Customize actions | ● none | |
| ‹ View quick settings | Availability | | |

FIG. 3A

USER AVAILABILITY IN PERSONAL INFORMATION MANAGEMENT SERVICE

BACKGROUND

Many personal information management services include calendars containing availability information viewable by others in the same organization. For example, a user's work calendar may indicate when the user is free for a coworker to schedule a meeting. However, many people maintain multiple calendars, such as a work calendar and a personal calendar, and items on one calendar may affect the user's availability during free times on the other calendar. In this case, scheduling an event shared by multiple participants may take substantial back-and-forth communication to find a workable timeslot. In an attempt to prevent this hassle, some users add entries to their work calendars to block off time for personal events to better represent their work availability, but they run the risk of exposing personal information or forgetting to manually add such an entry.

SUMMARY

A computing device disclosed herein may include a processor and associated memory. The processor may be configured to execute a personal information management service stored in memory to send a first calendar entry for display on a calendar interface for a user. The first calendar entry may be for a first account of the user of a first domain. The processor may send a second calendar entry for display on the calendar interface. The second calendar entry may be for a calendar of a second account of the user of a second domain. The processor may receive a request for an availability of the user from a requesting user having a third account of the first domain. In response to the request, the processor may send to the requesting user the first calendar entry including first calendar entry details, and the second calendar entry without second calendar entry details.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 3A-3C are example graphic user interfaces for activating the true availability feature among linked accounts on various client devices.

DETAILED DESCRIPTION

Figure 1:
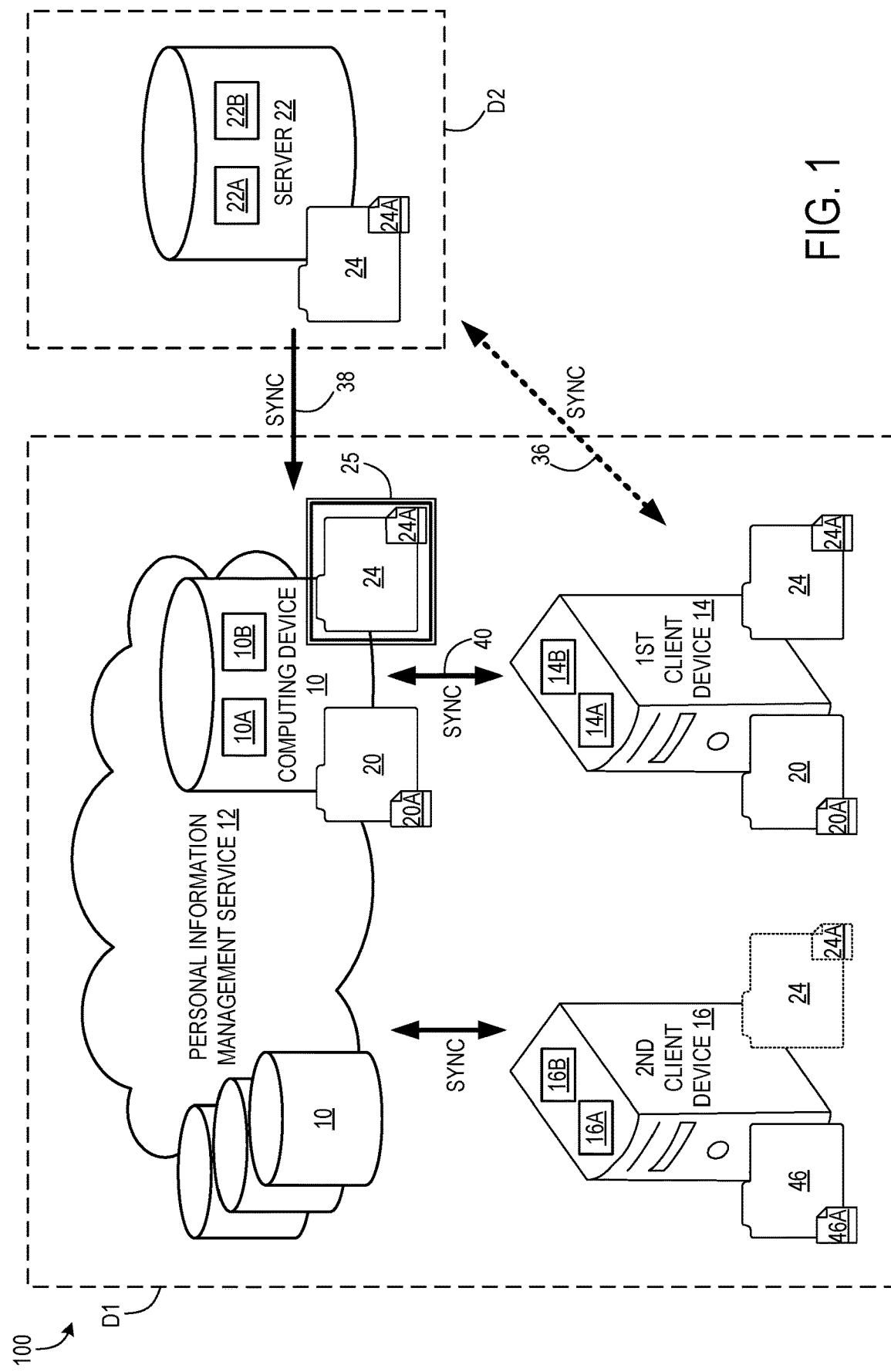
FIG. 1 is a schematic illustration of a computing system implementing a personal information management service.

FIG. 1 is a schematic illustration of a computing system 100 implementing a personal information management service 12. Briefly, the computing system 100 may include at least one processor and associated memory. For example, the computing system 100 may include one or more server computing devices 10 having a processor 10A and memory 10B, a first client device 14 having a processor 14A and memory 14B, and a second client device 16 having a processor 16A and memory 16B, among other devices connected by the Internet, etc. The at least one processor may be configured to execute the personal information management service 12 stored in the memory to cause one or more of the computing devices 10, 14, 16 to implement various functions described below. The personal information management service 12 may be a cloud-based service including an email service, a calendar service, a task management service, and a contact service, for example. One example of the personal information management service 12 is Microsoft® Office 365®'s Outlook®, but other suitable services may be used.

Figure 2:
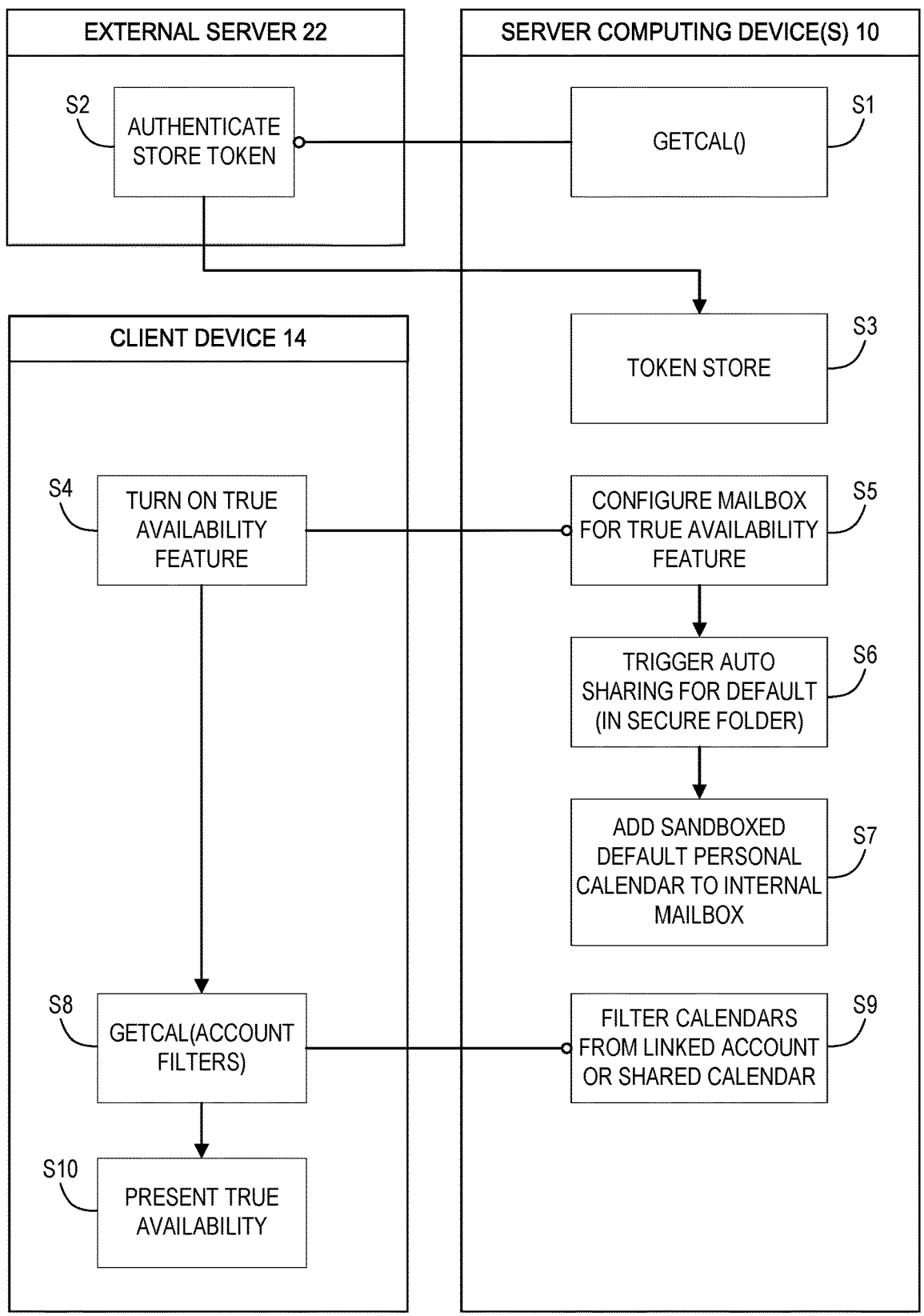
FIG. 2 is an architecture diagram of the computing system of FIG. 1 implementing a true availability feature of the personal information management service.

FIG. 2 is an architecture diagram of the computing system 100 of FIG. 1 implementing a true availability feature of the personal information management service 12. Here, the user has two accounts at two different domains. A first account of the user, user1@domain1.com, may be a work account which is authenticated by a first set of credentials, and may belong to a first domain D1 internal to the computing system 100. For example, the first domain D1 may be hosted by one or more of the server computing devices 10. The first domain D1, domain1.com, may be hosted directly by servers of a company using the first domain D1 and at which the user works, or it may be hosted by servers of a personal information management service provider, such as Microsoft® Office 365® or other company offering email and calendaring services. In the case of using a service provider, the personal information management service 12 may be executed to display a calendar interface 18 (see FIGS. 5 and 6) for the user at the first client device 14. The calendar interface 18 may display a calendar 20 of the first account. The first client device 14 may be running a software client such as Outlook® desktop, or a web browser directed to a web portal such as Outlook Web App® (OWA®), for example.

However, the user may also have a second account of a second domain D2 external to the computing system 100. This second account may be a personal account, a work account for a second job, etc., and may contain a second calendar 24 having entries indicating the availability of the user. In one example, the first and second domains D1, D2 may be controlled or owned by different entities. For example, MICROSOFT® Corporation may control one of the domains and a third party may control another one of the domains. Typically, domains that are owned or controlled by different parties cannot be relied upon to share a software interface (e.g., API) that enables coordinated communication between the domains. The disclosed configurations offer the potential technical advantage some calendar information can be shared in a manner that maintains a user's privacy without requiring an API to be provisioned for shared communication between the domains. To link the accounts together, the user may, at the first client device 14, request the personal information management service 12 to add the second account. Because the second account is at the second domain D2 and not the first domain D1, the personal information management service 12 requests an external server 22 having a processor 22A and associated memory 22B that hosts the second domain D2 to authenticate access to the second account (S1). For example, an Open Authorization (OAuth) handshake (see FIGS. 4A-B) may be performed between the personal information management service 12 and the external server 22. After the user submits login credentials and the handshake is performed (S2), then the personal information management service 12 may receive an authentication token. The authentication token may be stored in the memory 10B for retrieving a copy of the calendar of the second account from the external server 22 of the second domain D2 (S3).

Now that the user's accounts are linked, the user has access to the calendars of both accounts from the client running on the client device 14. However, other users from the user's work network, that is, having accounts also of the first domain D1, cannot see the calendar of the second account, even if they have authorization to view the calendar of the user's first account. To show the user's true availability, the user may activate a true availability feature of the personal information management service 12 at the first client device 14 (S4). When the server computing device 10 receives an indication that the true availability feature has been turned on, a mailbox of the first account, including the calendar 20 of the first account, may be configured for the true availability feature (S5). However, an IT administrator may have the ability to turn the true availability feature and account linking on/off on a domain or network basis or user basis.

The true availability feature may include various customizable settings such as auto syncing and privacy that may be set at an IT administrator level and/or user level, and auto sharing may be triggered for the calendar 24, which may be the default calendar of the second account (SG). Alternatively, the calendar 24 may be a secondary calendar of the second account, and the user may be able to choose from among multiple calendars of the second account. Further, a default calendar and one or more secondary calendars may both be shared as a combined calendar or as separate calendars. Then, a copy of the calendar 24 of the second account may be stored in memory of a server (e.g., memory 10B of server computing device 10) of the first domain D1 in a sandboxed state (S7). In the sandboxed state, all data belonging to the second account, which may be personal data of the user, may be completely private and only accessible by the user in a secure folder 25. Even an IT administrator of the first domain D1 may be prevented from accessing the sandboxed data. In addition, upon receiving a request to unlink the second account from the first account, the one or more processors may be further configured to delete the copy of the calendar 24 of the second account. In this manner, the personal information management service 12 may comply with privacy regulations regarding personal data.

After the true availability feature is activated and the calendar 24 of the second account is sandboxed, when the user checks their own availability (S8), or an authorized user checks the user's availability, the server computing device 10 filters all linked calendars including the calendars of the first and second accounts (S9), and then the true availability feature may present the user's availability (S10), taking into account all linked calendars.

Figure 3B:
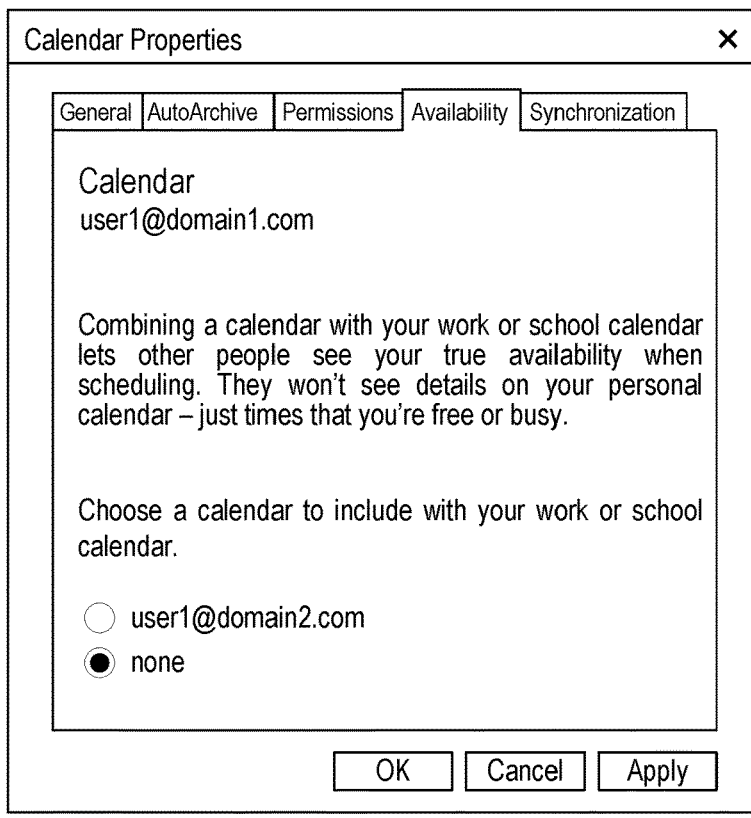
Figure 3C:
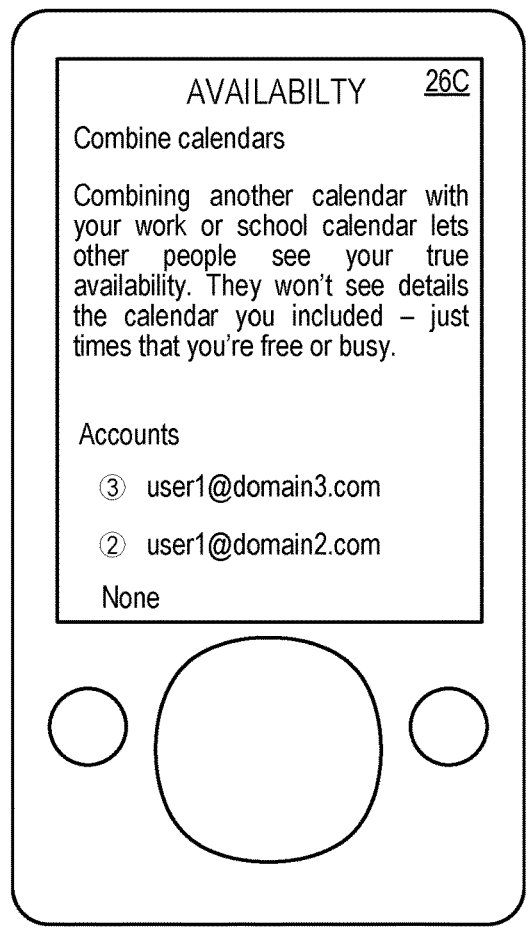

FIGS. 3A-C are example graphic user interfaces for activating the true availability feature among linked accounts on various client devices such as the client devices 14, 16. FIG. 3A shows an interface 26A that may be displayed on a web-based portal accessed by a client device. FIG. 3B shows an interface 26B that may be displayed on a desktop client running on a desktop or laptop client device, for example. FIG. 3C shows an interface 26C that may be displayed on a mobile app running on a mobile client device such as a smartphone. Once the true availability feature is activated via any client device, the availability indicated by the second account is included when reporting the availability of the user across all client devices that are authorized to view the user's availability. In all depicted examples, the true availability feature may be turned off by the user at any client device with access to feature controls. Further, while only one second account is illustrated (user1@domain2.com), additional accounts may be linkable.

Figure 4A:
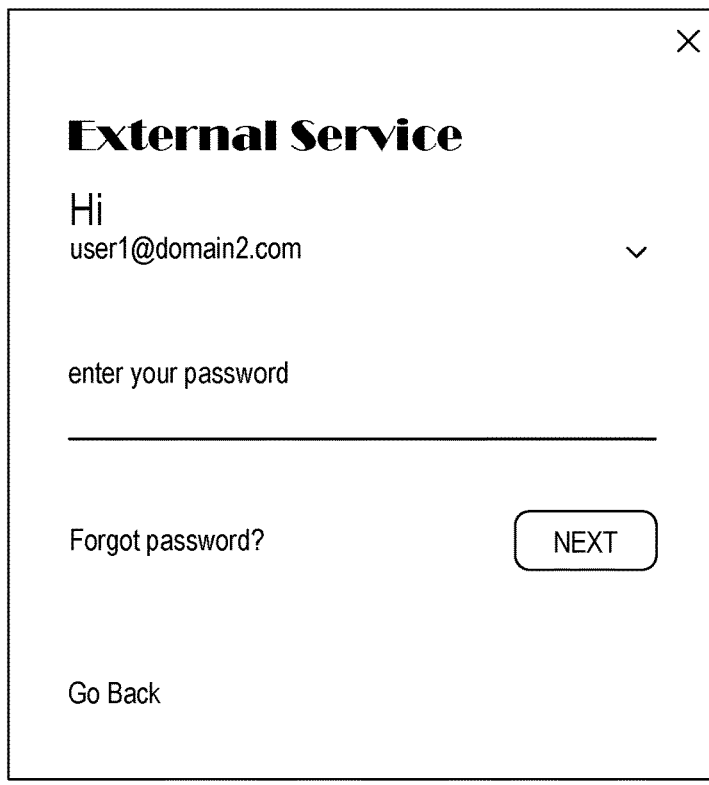
FIGS. 4A-4B are example graphic user interfaces for authenticating access to a linked account.
Figure 4B:
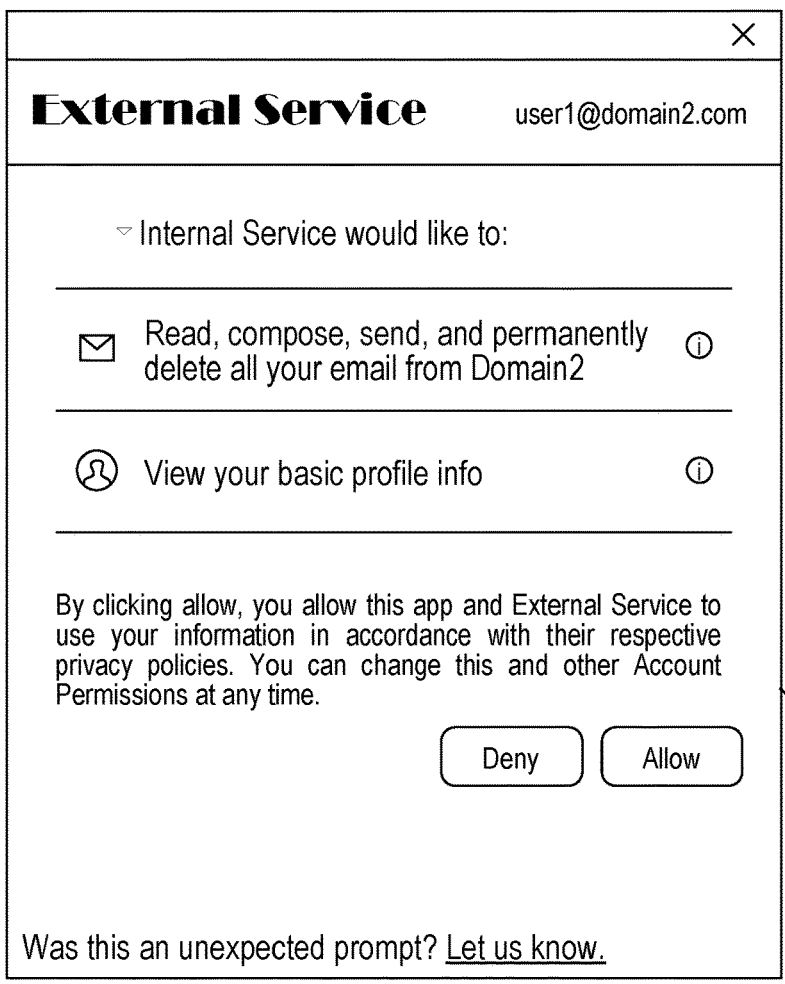

FIGS. 4A-B are example graphic user interfaces for authenticating access to a linked account, as in step S2 of FIG. 2. As discussed above, the accounts may be linked via an OAuth handshake, although other suitable authentication methods may be adopted. In interface 28A of FIG. 4A, after the user enters the name of the second account, the user is prompted to enter a password for authenticating the second account. In interface 28B of FIG. 4B, after the user's credentials are verified, the user may confirm or deny any listed permission requests by the personal information management service 12. If the permission requests are denied, the authentication may fail, and the second account may not be linked. If the permission requests are confirmed, then the accounts may be linked.

As discussed above, the computing system 100 may include one or more server computing devices 10. One or more of the server computing devices 10 may be an example of a computing device comprising the processor 10A and associated memory 10B. Briefly, the processor 10A may be configured to execute the personal information management service 12 stored in memory 10B to send a first calendar entry 20A for display on a calendar interface 18 for the user, the first calendar entry 20A being for the first account of the user of the first domain D1. The computing device may send a second calendar entry 24A for display on the calendar interface 18, the second calendar entry 24A being for the calendar 24 of the second account of the user of the second domain D2. The computing device may receive a request for an availability of the user from the requesting user having a third account of the first domain D1. The computing device may, in response to the request, send to the requesting user the first calendar entry 20A including first calendar entry details 20B, and the second calendar entry 24A without second calendar entry details 20B. This functionality of the personal information management service 12 will be explained below in greater detail with reference to the graphical interfaces shown in FIGS. 5-8.

Figure 5:
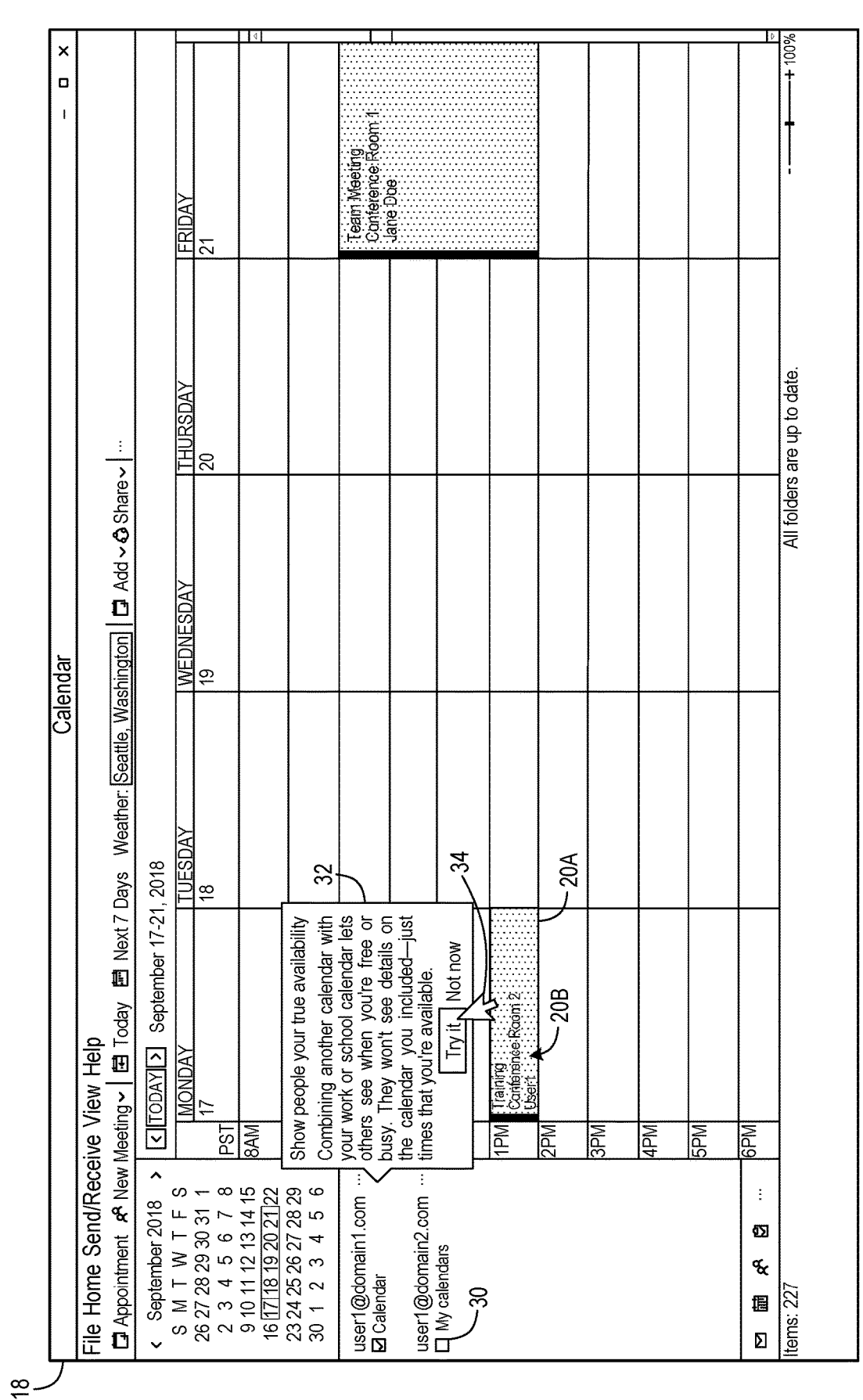
FIG. 5 is an example calendar interface where the true availability feature is being activated.

FIG. 5 is an example calendar interface 18 where the true availability feature is being activated. Here, the personal information management service 12 may be executed to cause the client device 14 to display the first calendar entry 20A on the calendar interface 18. The first calendar entry 20A may be for the first account of the user. Here, the second account has already been linked to the first account, but the user has chosen not to display the calendar 24 of the second account at this client device 14, by unchecking box 30. Thus, all calendar entries currently displayed in FIG. 5 belong to the first account. The true availability feature may be turned on via any of the example graphic user interfaces shown in FIGS. 3A-C. In addition, a prompt 32 may inform the user that the true availability feature may be turned on. In this example, the user selects "Try it" and the true availability feature is activated, as shown in FIG. 6.

Figure 6:
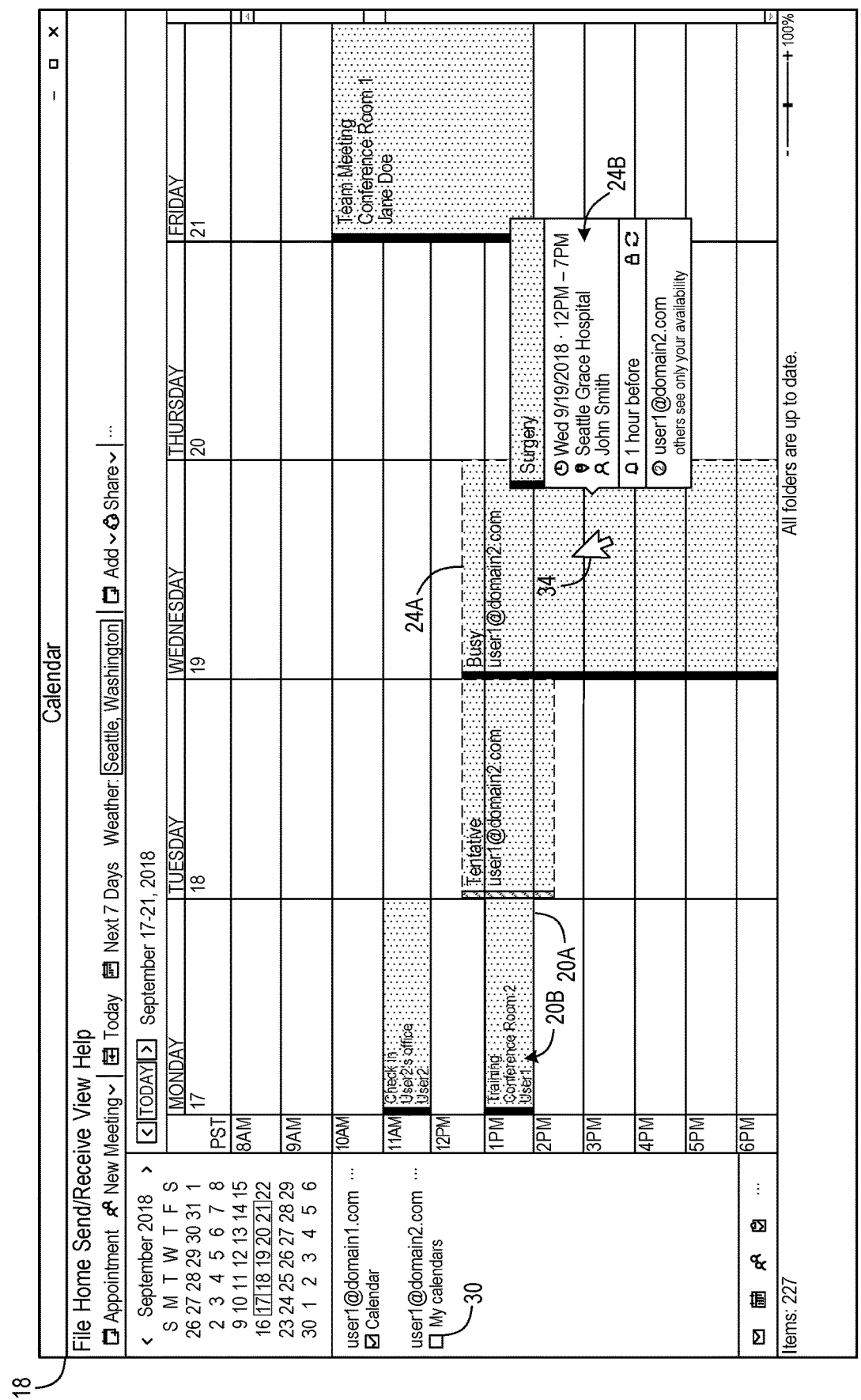
FIG. 6 is an example calendar interface where a second account has been linked but is hidden.

FIG. 6 is an example calendar interface 18 where a second account has been linked but is hidden. As shown, the personal information management service 12 may be executed to cause the client device 14 to display the second calendar entry 24A on the calendar interface 18. The second calendar entry 24A may be for the calendar 24 of the second account of the user. Because the user has turned off viewing the calendar 24, without the true availability feature, the second calendar entry 24A would not be displayed. However, because the true availability feature has been activated, even though the calendar 24 is hidden, the second calendar entry is still displayed. However, the second calendar entry 24A may lack calendar entry details such as subject, location, other attendees, etc. The second calendar entry 24A, without second calendar entry details, may include a time period (here, 12:30 pm to 1:30 pm on Sep. 18, 2018) and an availability status (here, busy). This availability information may facilitate scheduling between multiple participants without unnecessarily exposing personal data. In addition, because it is the user viewing their own calendar 24, the hidden second calendar entry details 24B may be viewable by hovering a cursor 34 over the second calendar entry 24A, or tapping, for example. The availability status of the second calendar entry 24A may be set by a combination of default settings and user input at the calendar 24 of the second account before it is retrieved by the personal information management service 12. The time period and availability status indicated by the second calendar entry 24A, in combination with corresponding information of other calendar entries of the first and second accounts, may be used in other features of the personal information management service 12 and possibly even other application programs. For example, an indication of the user's current availability may be presented to another user of the first domain D1 upon receiving an email from the user, or when the user is logged into an instant messaging application.

In order to display the second calendar entry 24A on the calendar interface 18 of the first client device 14, the first client device 14 may query the server 22 of the second domain D2. In this manner, the first client device 14 may sync changes from the server 22 of the second domain D2 (indicated by an arrow 36 in FIG. 1). Rather than contact the server 22 of the second domain D2, the first client device 14 may instead receive the second calendar entry 24A from the sandboxed secure folder 25 in the server computing device 10 of the computing system 100. Accordingly, the server computing device 10 may be configured to receive an update to the second calendar entry 24A from the server 24 of the second domain D2 (indicated by an arrow 38 in FIG. 1), and send the update to the user for display on the calendar interface 18 (indicated by an arrow 40 in FIG. 1).

The calendar interface 18 may include the first calendar entry 20A and the second calendar entry 24A in an aggregate calendar view for the user. Alternatively, the calendar 24 of the second account may be displayed as a separate calendar adjacent the calendar 20 of the first account. The calendar interface may visually distinguish between calendar entries of the first account and calendar entries of the second account, when the user is viewing the calendar interface 18. In the illustrated example, the first and second entries 20A, 24A are visually distinguished in a number of ways. The first entry 20A may be opaque while the second entry 24A may be transparent. The second entry 24A may be displayed with the second account name ("user1@domain2.com") and a status label indicating availability ("Busy") while the first entry 20A may lack each of these in a main view of the calendar interface 18. The first entry 20A may be colored a first color or filled with a first pattern while the second entry 24A may be colored a second color or filled with a second pattern, for example. Other suitable visual indicators may be adopted. In the illustrated example, the second entry 24A may be transparent due to the box 30 being unchecked. However, if the user checked the box 30 to turn on display of the calendar 24 of the second account, then the second entry 24A may be made opaque and may also be set to a different color than the first entry 20A, in addition to displaying the second calendar entry details 24B.

Figure 7:
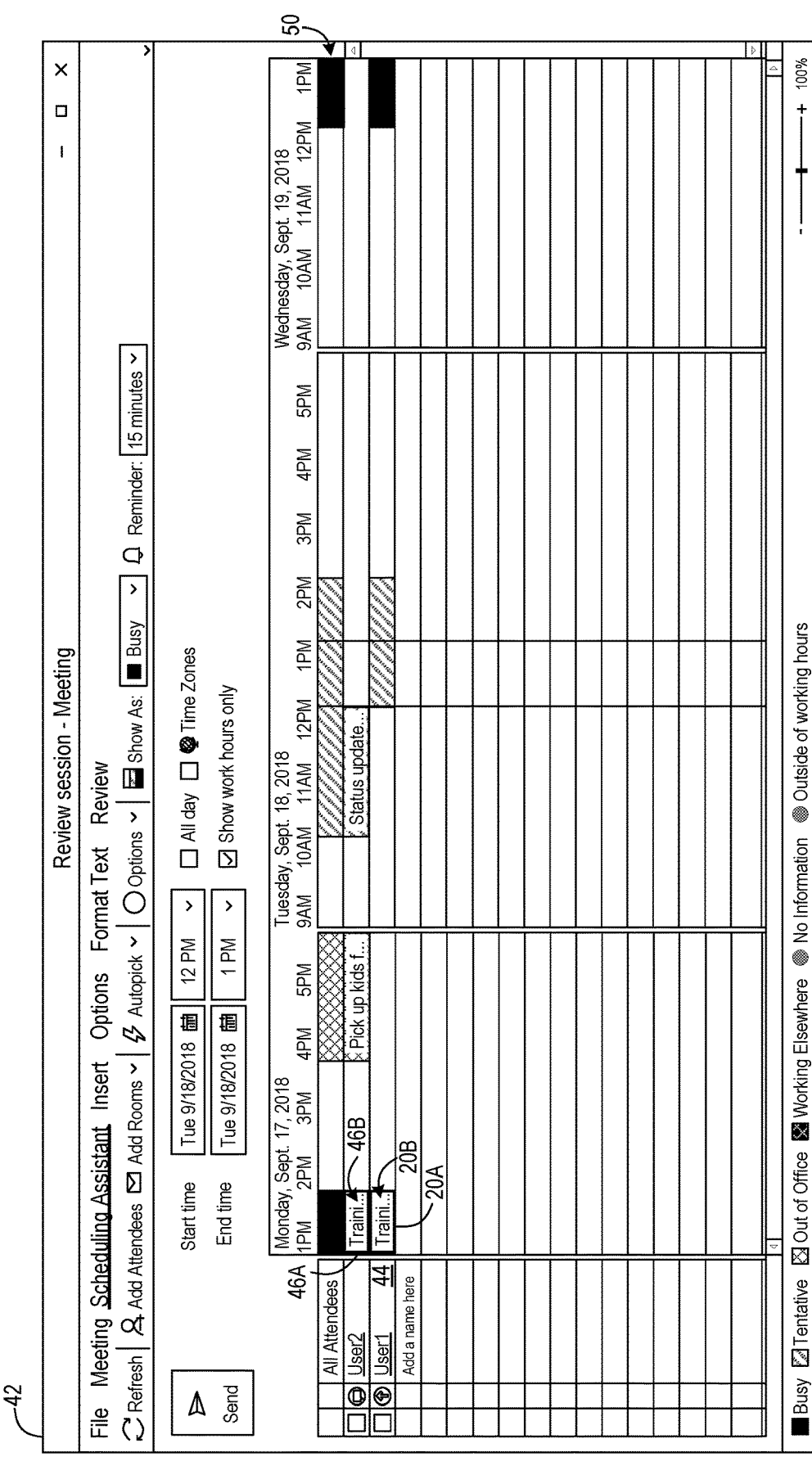
FIG. 7 is an example graphic user interface of the personal information management service for scheduling a meeting using user availability.

FIG. 7 is an example graphic user interface 42 of the personal information management service 12 for scheduling a meeting using user availability. The personal information management service 12 may receive a request for an availability of the user from a requesting user, via the second client device 16, having a third account of the first domain D1. In this example, the interface 42 is presented to the requesting user at the client device 16, and the request is made by entering the user's name into an attendee field 44. When the requesting user, user2@domain1.com, uses a scheduling assistant feature of the personal information management service 12 to set a meeting time with the user, the requesting user is able to see simplified calendar entries of each user invited to the meeting, including the user, based on authorization settings. The requesting user is also able to see a third calendar entry 46A of the requesting user's own calendar 46, including third calendar entry details 46B. While the details 46B are abbreviated in the view of FIG. 7, additional details may be viewable as in the interface 18 of FIG. 6 by hovering the cursor 34 over the third calendar entry 46A, etc.

Since the user turned on the true availability feature, in response to the request, the personal information management service 12 may cause the second client device 16 to display the first calendar entry 20A including first calendar entry details 20B, and the second calendar entry 24A without second calendar entry details 24B. In addition, even stripped of the second calendar entry details 24B, the second calendar entry 24A may still include an indication that the entry 24A belongs to the user (that is, the entry is listed across from the addressee field 44 where "User1" is entered), a time period and date (here, Thursday, Sep. 19, 2018, beginning at 12 PM), and an availability status (here, based on a legend 48 provided in the interface 42, the availability status is "busy"), for example. A line 50 corresponding to "all attendees" may have time blocked off where any attendee is unavailable based on their respective calendar entries. Accordingly, as illustrated, the requesting user is able to see the user's true availability, taking into consideration both the first account and second account of the user, without the user's personal information being exposed to others in the first domain D1.

While FIG. 6 shows an example calendar interface 18 in which the second calendar entry 24A is displayed for the user without the second calendar entry details 24B, upon receiving a request from the user to hide all calendar entries from the second account in the calendar interface 18 (e.g., by unchecking the box 30), the at least one processor 10A, 14A, 14B may be configured to cause the first client device 14 to cease displaying the second calendar entry 24A in the calendar interface 18, as in FIG. 5. However, the at least one processor 10A, 14A, 14B may be configured to cause the second client device 16 to continue to allow the requesting user access to the second calendar entry 24A without the second calendar entry details 24B. Thus, since the true availability feature is still turned on for the first account, even if the user turns off display of the calendar 24 of the second account in the calendar interface 18 of any given client of the user, the user's combined availability from both accounts is still presented to authorized users of the first domain D1. Furthermore, if the user queried their own availability by, for example, creating a new meeting invitation and using the scheduling assistant feature to view all attendees' availability, then the true availability feature may still provide the second calendar entry 24A without the second calendar entry details 24B for the user as well.

Figure 8:
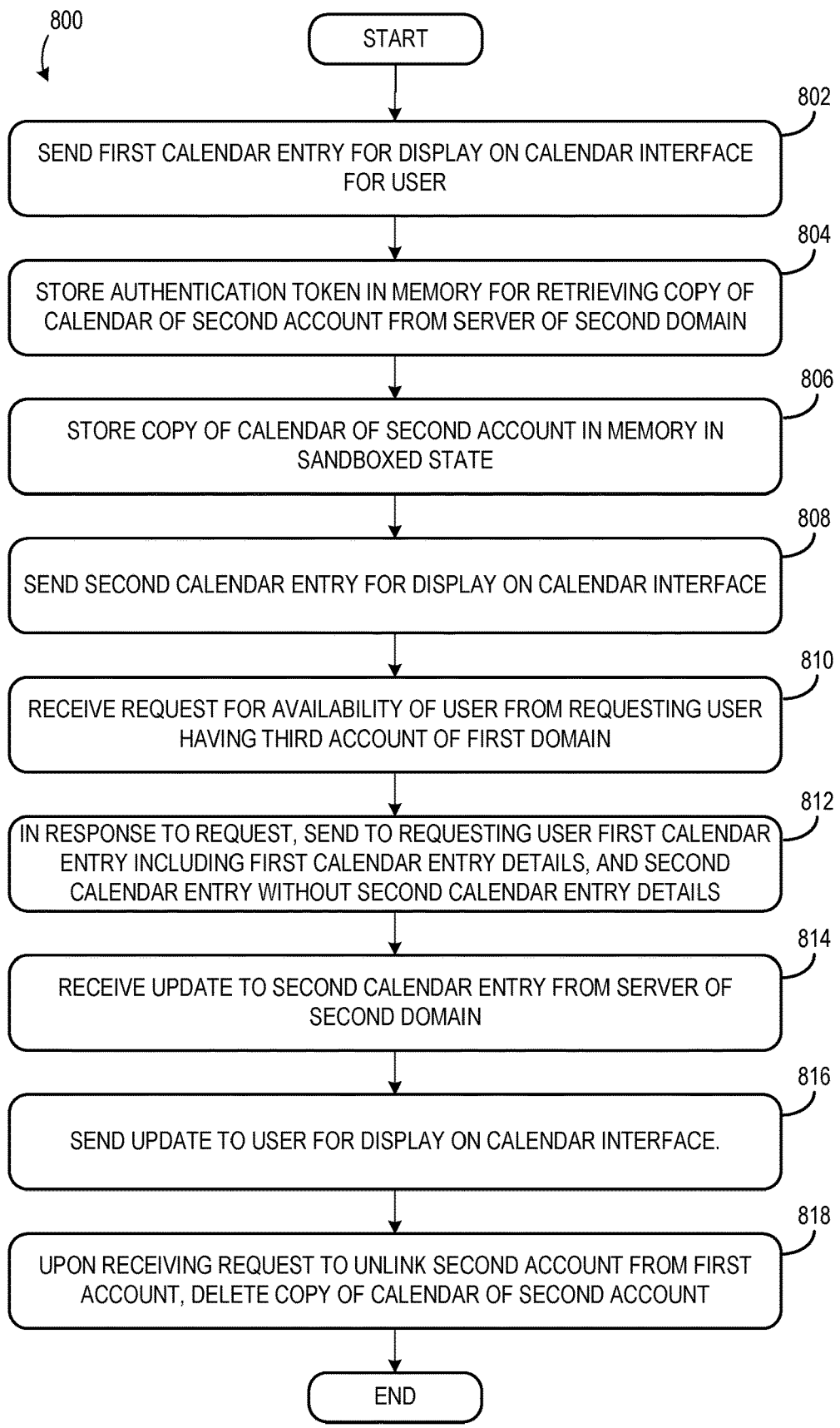
FIG. 8 is a flowchart of a personal information management method.

FIG. 8 shows a flowchart of a personal information management method 800. The following description of method 800 is provided with reference to the computing system 100 described above and shown in FIG. 1. It will be appreciated that method 800 may also be performed in other contexts using other suitable components.

With reference to FIG. 8, at 802, the method 800 may include sending a first calendar entry for display on a calendar interface for a user, the first calendar entry being for a first account of the user of a first domain. The first account may be, for example, a work account. At 804, the method 800 may include storing an authentication token in memory for retrieving a copy of a calendar of a second account of the user from a server of a second domain. The second account may be, for example, a personal account. The authentication token may be received from the server of the second domain as part of an OAuth handshake, for example. At 806, the method 800 may include storing a copy of the calendar of the second account in memory in a sandboxed state. As discussed above, the copy may be sandboxed by setting up a secure folder to which only the user has access. Alternatively, the copy of the calendar of the second account retrieved from the server of the second domain may be stripped of personal information and may, for example, include time and availability status while not including a subject, location, or other attendees. Accordingly, as no personal information is stored in a server of the first domain to be exposed, sandboxing the data of the second account may not be performed. At 808, the method 800 may include sending a second calendar entry for display on the calendar interface, the second calendar entry being for the calendar of the second account of the user of the second domain. The second calendar entry may be displayed on the calendar interface because it is the user's own entry from the second account.

At 810, the method 800 may include receiving a request for an availability of the user from a requesting user having a third account of the first domain. The requesting user may be a coworker, etc., authorized to be on the same work network as the user. The requesting user has login credentials that have been authenticated to grant access to the personal information management service and also has permission to view the user's non-private calendar entries. At 812, the method 800 may include, in response to the request, sending to the requesting user the first calendar entry including first calendar entry details, and the second calendar entry without second calendar entry details. In one example, the second calendar entry, without the second calendar entry details, may include a time period and an availability status. Accordingly, the requesting user may be informed of the user's availability without the user having to expose their personal information to other users of the first domain. Furthermore, if the requesting user does not have permission to view the user's calendar, then both the first and second calendar entries may instead be displayed without calendar entry details, so that the user's availability is still conveyed to the requesting user.

At 814, the method 800 may include receiving an update to the second calendar entry from a server of the second domain, and at 816, sending the update to the user for display on the calendar interface. The client device used by the user may be configured to query the server of the second domain directly to sync updates, or the server of the first domain may sync updates to the sandboxed folder, if included, and then send the updates to the client device. When the sandboxed folder is included, at 818, the method 800 may include, upon receiving a request to unlink the second account from the first account, deleting the copy of the calendar of the second account. In this manner, the user's private data may be protected from start to finish when linking accounts.

The systems and methods disclosed above may be used to incorporate a second calendar of a user from outside of a domain (e.g., the user's work email network) when the user or another user having an account in the same domain (e.g., a coworker) checks the user's availability. This reduces common back-and-forth scheduling efforts to find common openings in each meeting attendee's schedule, and does not require the user to add duplicate entries to two calendars. In addition, personal data is obfuscated before being sent to another user, and is kept strictly private in a sandboxed folder from any other user, even an IT administrator. Accordingly, the user's personal data is kept safe from exposure while the user's true availability is presented.

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
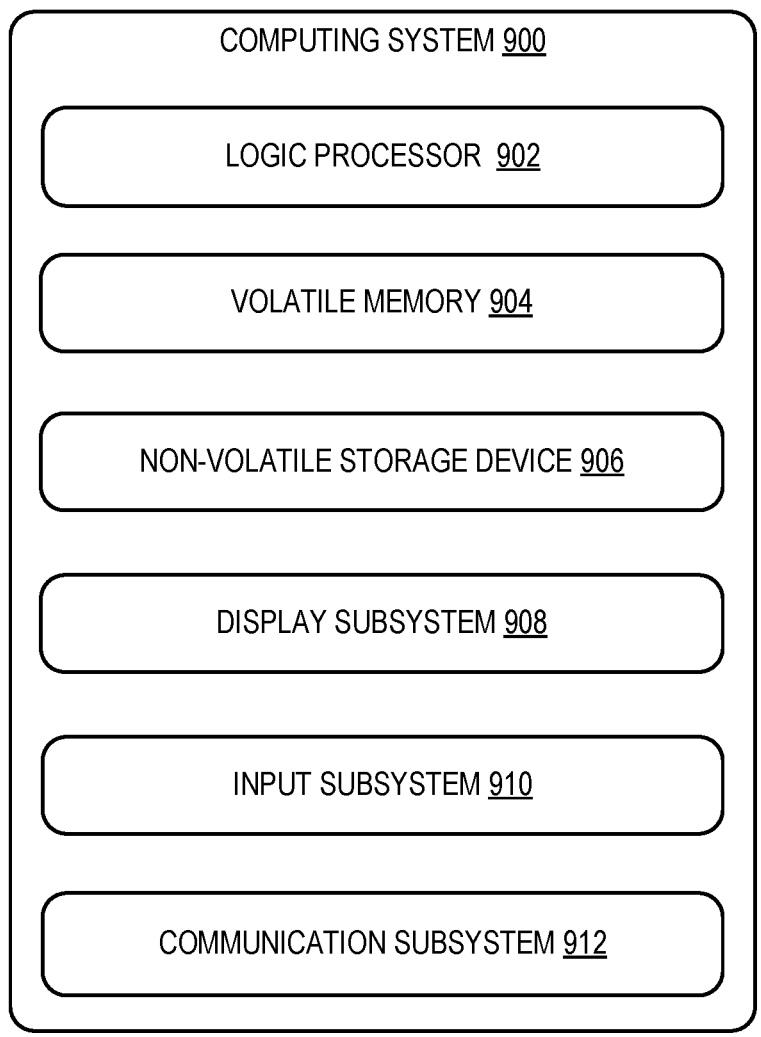
FIG. 9 is an example computing system according to an embodiment of the present description.

FIG. 9 schematically shows a non-limiting embodiment of a computing system 900 that can enact one or more of the methods and processes described above. Computing system 900 is shown in simplified form. Computing system 900 may embody the computer device 10 described above and illustrated in FIG. 2. Computing system 900 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 900 includes a logic processor 902 volatile memory 904, and a non-volatile storage device 906. Computing system 900 may optionally include a display subsystem 908, input subsystem 910, communication subsystem 912, and/or other components not shown in FIG. 9.

Logic processor 902 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 902 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 906 includes one or more physical devices configured to hold instructions executable by the logic processors to implement the methods and processes described herein. When such methods and processes are implemented, the state of non-volatile storage device 906 may be transformed—e.g., to hold different data.

Non-volatile storage device 906 may include physical devices that are removable and/or built-in. Non-volatile storage device 906 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 906 may include nonvolatile, dynamic, static, read/write, read-only, sequential-access, location-addressable, file-addressable, and/or content-addressable devices. It will be appreciated that non-volatile storage device 906 is configured to hold instructions even when power is cut to the non-volatile storage device 906.

Volatile memory 904 may include physical devices that include random access memory. Volatile memory 904 is typically utilized by logic processor 902 to temporarily store information during processing of software instructions. It will be appreciated that volatile memory 904 typically does not continue to store instructions when power is cut to the volatile memory 904.

Aspects of logic processor 902, volatile memory 904, and non-volatile storage device 906 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "program" and "service" may be used to describe an aspect of computing system 900 typically implemented in software by a processor to perform a particular function using portions of volatile memory, which function involves transformative processing that specially configures the processor to perform the function. Thus, a program or service may be instantiated via logic processor 902 executing instructions held by non-volatile storage device 906, using portions of volatile memory 904. It will be understood that different programs and/or services may be instantiated from the same application, service, code block, object, library, routine, API, function, etc. Likewise, the same program and/or service may be instantiated by different applications, services, code blocks, objects, routines, APIs, functions, etc. The terms "program" and "service" may encompass individual or groups of executable files, data files, libraries, drivers, scripts, database records, etc.

When included, display subsystem 908 may be used to present a visual representation of data held by non-volatile storage device 906. The visual representation may take the form of a graphical user interface (GUI). As the herein described methods and processes change the data held by the non-volatile storage device, and thus transform the state of the non-volatile storage device, the state of display subsystem 908 may likewise be transformed to visually represent changes in the underlying data. Display subsystem 908 may include one or more display devices utilizing virtually any type of technology. Such display devices may be combined with logic processor 902, volatile memory 904, and/or non-volatile storage device 906 in a shared enclosure, or such display devices may be peripheral display devices.

When included, input subsystem 910 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 912 may be configured to communicatively couple various computing devices described herein with each other, and with other devices. Communication subsystem 912 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 900 to send and/or receive messages to and/or from other devices via a network such as the Internet.

The following paragraphs provide additional support for the claims of the subject application. One aspect provides a computing device comprising a processor and associated memory. The processor may be configured to execute a personal information management service stored in memory, to send a first calendar entry for display on a calendar interface for a user, the first calendar entry being for a first account of the user of a first domain, send a second calendar entry for display on the calendar interface, the second calendar entry being for a calendar of a second account of the user of a second domain, receive a request for an availability of the user from a requesting user having a third account of the first domain, and in response to the request, send to the requesting user the first calendar entry including first calendar entry details, and the second calendar entry without second calendar entry details. In this aspect, additionally or alternatively, a copy of the calendar of the second account may be stored in the memory in a sandboxed state. In this aspect, additionally or alternatively, upon receiving a request to unlink the second account from the first account, the processor may be further configured to delete the copy of the calendar of the second account. In this aspect, additionally or alternatively, an authentication token may be stored in the memory for retrieving a copy of the calendar of the second account from an external server. In this aspect, additionally or alternatively, the second calendar entry, without second calendar entry details, may include a time period and an availability status. In this aspect, additionally or alternatively, the computing device may be configured to receive an update to the second calendar entry from a server of the second domain, and send the update to the user for display on the calendar interface.

Another aspect provides a personal information management method. The method may comprise sending a first calendar entry for display on a calendar interface for a user, the first calendar entry being for a first account of the user of a first domain, sending a second calendar entry for display on the calendar interface, the second calendar entry being for a calendar of a second account of the user of a second domain, receiving a request for an availability of the user from a requesting user having a third account of the first domain, and in response to the request, sending to the requesting user the first calendar entry including first calendar entry details, and the second calendar entry without second calendar entry details. In this aspect, additionally or alternatively, the method may further comprise storing a copy of the calendar of the second account in memory in a sandboxed state. In this aspect, additionally or alternatively, the method may further comprise, upon receiving a request to unlink the second account from the first account, deleting the copy of the calendar of the second account. In this aspect, additionally or alternatively, the method may further comprise storing an authentication token in memory for retrieving a copy of the calendar of the second account from a server of the second domain. In this aspect, additionally or alternatively, the second calendar entry, without the second calendar entry details, may include a time period and an availability status. In this aspect, additionally or alternatively, the method may further comprise receiving an update to the second calendar entry from a server of the second domain, and sending the update to the user for display on the calendar interface.

Another aspect provides a computing system comprising at least one processor and associated memory. The at least one processor may be configured to execute a personal information management service stored in memory, to cause one or more computing devices to display a calendar interface for a user at a first client device, display a first calendar entry on the calendar interface, the first calendar entry being for a first account of the user of a first domain internal to the computing system, display a second calendar entry on the calendar interface, the second calendar entry being for a calendar of a second account of the user of a second domain external to the computing system, receive a request for an availability of the user from a requesting user, via a second client device, having a third account of the first domain, and in response to the request, display at the second client device the first calendar entry including first calendar entry details, and the second calendar entry without second calendar entry details. In this aspect, additionally or alternatively, a copy of the calendar of the second account may be stored in memory of a server of the first domain in a sandboxed state. In this aspect, additionally or alternatively, upon receiving a request to unlink the second account from the first account, the one or more processors may be further configured to delete the copy of the calendar of the second account. In this aspect, additionally or alternatively, in order to display the second calendar entry on the calendar interface of the first client device, the first client device may query a server of the second domain. In this aspect, additionally or alternatively, an authentication token may be stored in the memory for retrieving a copy of the calendar of the second account from the second domain. In this aspect, additionally or alternatively, the second calendar entry, without second calendar entry details, may include a time period and an availability status. In this aspect, additionally or alternatively, the calendar interface may include the first calendar entry and the second calendar entry in an aggregate calendar view for the user, and the calendar interface may visually distinguish between calendar entries of the first account and calendar entries of the second account. In this aspect, additionally or alternatively, upon receiving a request from the user to hide all calendar entries from the second account in the calendar interface, the at least one processor may be configured to cause the first client device to cease displaying the second calendar entry in the calendar interface, and cause the second client device to continue to allow the requesting user access to the second calendar entry without the second calendar entry details.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system comprising:
at least one processor and associated memory, the at least one processor configured to execute a personal information management service stored in memory, to cause one or more computing devices to:
display a calendar interface for a first user at a first client device;
display a first calendar entry including first calendar entry details on the calendar interface, the first calendar entry being for a first account of the first user of a first domain internal to the computing system;
display a second calendar entry without second calendar entry details on the calendar interface, the second calendar entry being for a calendar of a second account of the first user of a second domain external to the computing system;
receive, via a second client device, a request for availabilities of the first user and a second user; and
in response to the request, display at the second client device the first calendar entry including the first calendar entry details, and the second calendar entry without the second calendar entry details, wherein
upon receiving a request from the first user to hide all calendar entries from the second account in the calendar interface on the first client device, the at least one processor is configured to:
cause the first client device to cease displaying the second calendar entry in the calendar interface; and
cause the second client device to continue to allow the second user to view the second calendar entry, and the second calendar entry details remain hidden when the second user hovers a cursor over or taps the second calendar entry.

2. The computing system of claim 1, wherein a copy of the calendar of the second account is stored in memory of a server of the first domain in a sandboxed state.

3. The computing system of claim 2, wherein upon receiving a request to unlink the second account from the first account, the one or more processors are further configured to delete the copy of the calendar of the second account.

4. The computing system of claim 2, wherein in order to display the second calendar entry on the calendar interface of the first client device, the first client device queries a server of the second domain.

5. The computing system of claim 1, wherein an authentication token is stored in the memory for retrieving a copy of the calendar of the second account from the second domain.

6. The computing system of claim 1, wherein the second calendar entry, without the second calendar entry details, includes a time period and an availability status.

7. The computing system of claim 1, wherein
the calendar interface includes the first calendar entry and the second calendar entry in an aggregate calendar view for the first user, and
the calendar interface visually distinguishes between calendar entries of the first account and calendar entries of the second account.

8. A personal information management method, comprising:
sending a first calendar entry including first calendar entry details for display on a calendar interface at a first client device for a first user, the first calendar entry being for a first account of the first user of a first domain;
sending a second calendar entry without second calendar entry details for display on the calendar interface, the second calendar entry being for a calendar of a second account of the first user of a second domain;
receiving, from a second client device, a request for availabilities of the first user and a second user; and
in response to the request, sending, to the second user on the second client device, the first calendar entry including the first calendar entry details, and the second calendar entry without the second calendar entry details, wherein
upon receiving a request from the first user to hide all calendar entries from the second account in the calendar interface on the first client device, the at least one processor is configured to:
cease displaying the second calendar entry in the calendar interface on the first client device; and
continue displaying the second calendar entry in the calendar interface on the second client device, thereby allowing the second user to view the second calendar entry, and
the second calendar entry details remain hidden when the second user hovers a cursor over or taps the second calendar entry.

9. The method of claim 8, further comprising storing a copy of the calendar of the second account in memory in a sandboxed state.

10. The method of claim 9, further comprising, upon receiving a request to unlink the second account from the first account, deleting the copy of the calendar of the second account.

11. The method of claim 9, further comprising querying, by the first client device, a server of the second domain to display the second calendar entry on the calendar interface of the first client device.

12. The method of claim 8, further comprising storing an authentication token in memory for retrieving a copy of the calendar of the second account from a server of the second domain.

13. The method of claim 8, wherein the second calendar entry, without the second calendar entry details, includes a time period and an availability status.

14. The method of claim 8, wherein
the calendar interface includes the first calendar entry and the second calendar entry in an aggregate calendar view for the first user, and
the calendar interface visually distinguishes between calendar entries of the first account and calendar entries of the second account.

* * * * *